United States Patent
Shimada et al.

[11] Patent Number: 5,905,598
[45] Date of Patent: *May 18, 1999

[54] ZOOM LENS APPARATUS

[75] Inventors: Keiichiro Shimada, Kanagawa; Norikatsu Inoue, Tokyo; Kunio Nakazato, Kanagawa; Hiroshi Kawamura, Tokyo, all of Japan

[73] Assignee: Sony Corporation, Japan

[*] Notice: This patent is subject to a terminal disclaimer.

[21] Appl. No.: 08/077,357

[22] Filed: Jun. 16, 1993

Related U.S. Application Data

[63] Continuation of application No. 07/899,358, Jun. 16, 1992, Pat. No. 5,241,422.

[30] Foreign Application Priority Data

Jun. 19, 1991 [JP] Japan .................................. 3-173399

[51] Int. Cl.⁶ ...................................................... G03B 7/26
[52] U.S. Cl. .......................... 359/694; 359/695; 359/696; 359/697; 359/698; 359/699; 359/700; 359/704
[58] Field of Search .................................. 359/694, 695, 359/696, 697, 698, 699, 700, 704; 354/226, 270, 286, 287, 288, 195.1, 195.12

[56] References Cited

U.S. PATENT DOCUMENTS

| | | | |
|---|---|---|---|
| 5,113,210 | 5/1992 | Kashiyama et al. | 354/226 |
| 5,241,422 | 8/1993 | Shimada et al. | 359/694 |
| 5,255,043 | 10/1993 | Kawasaki | 354/270 |
| 5,257,058 | 10/1993 | Mauachi | 354/286 |

*Primary Examiner*—Georgia Epps
*Attorney, Agent, or Firm*—Rader Fishman & Grauer; Ronald P. Kananen

[57] ABSTRACT

A zoom lens apparatus which is superior in sound insulating and dust-proof properties and is easy to handle in transportation, storage and so forth. A lens system including a zoom lens set, a focusing lens set and an iris disposed on a single optic axis, a zoom lens driving section composed of a motor, a ball screw, a lens holding member, a nut member and so forth for driving the zoom lens, a focusing lens driving section composed of a guide rod, a lens holding member, a movable coil, an outer yoke, magnets and so forth for driving the focusing lens, and an iris motor for opening and closing the iris are accommodated in the housing having a substantially rectangular outer profile.

2 Claims, 19 Drawing Sheets

F I G. 15
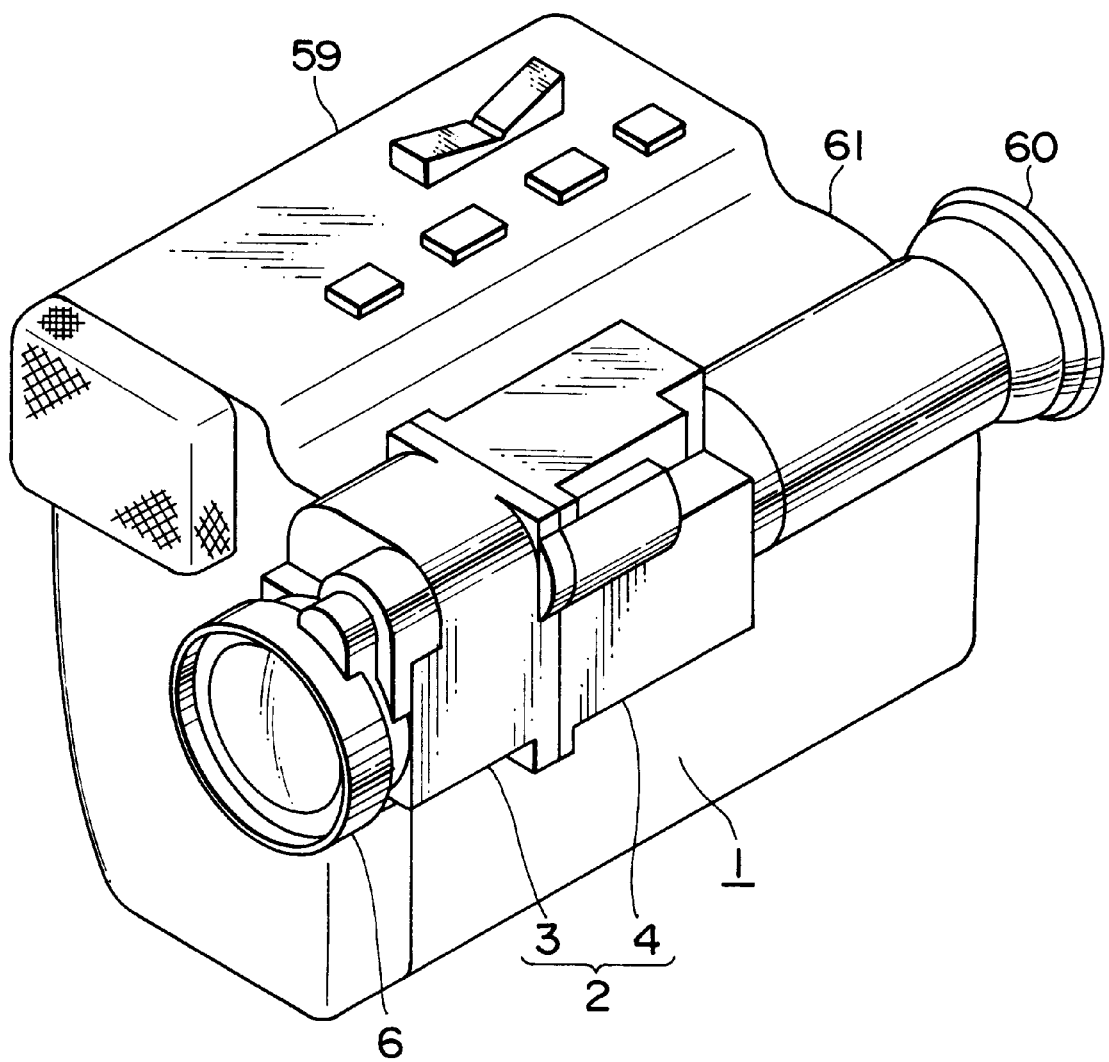

ZOOM LENS APPARATUS

This application is a continuation of application Ser. No. 07/899,358 filed Jun. 16, 1992, U.S. Pat. No. 5,241,422.

BACKGROUND OF THE INVENTION

1. Field of the Invention

This invention relates to a zoom lens apparatus for use, for example, with a video camera.

2. Description of the Prior Art

A zoom lens apparatus, for example, for use with a video camera or the like is conventionally constructed such that a lens barrel in which a lens system including a zoom lens, a focusing lens and an iris all disposed on a single optic axis is accommodated, a zoom lens driving section for driving the zoom lens, a focusing lens driving section for driving the focusing lens and an iris driving section for driving the iris to open or close are constructed in an integrated relationship with each other.

An exemplary one of such conventional zoom lens apparatus is shown in FIG. 19. Referring to FIG. 19, the zoom lens apparatus shown is generally denoted at a and includes a lens barrel b holding a plurality of lenses thereon and having a substantially cylindrical shape, and a lens driving mechanism c disposed at an upper portion of an outer peripheral face of a rear portion of the lens barrel b.

A cylindrical focusing lens ring d which serves also as a focusing lens barrel is formed from part of the lens barrel b, and a focusing lens e is held on the inner side of an end portion of the focusing lens ring d. The focusing lens ring d is screwed to an end portion of a zoom lens barrel h which will be hereinafter described such that, when the focusing lens d is turned, it is moved in a forward or rearward direction with respect to the other lens barrel b thereby to move the focusing lens e in a direction of an optic axis thereof.

Meanwhile, a toothed portion or gear f is formed over a range of almost 180 degrees in a circumferential direction at a substantially mid portion in the forward and rearward direction of an outer peripheral face of the focusing lens ring d, and an output gear of a focusing lens driving section which will be hereinafter described is held in meshing engagement with the toothed portion f.

A zoom lens ring g is outwardly fitted for turning motion on a zoom lens barrel h which is part of the lens barrel b, and if the zoom lens g is turned, then a zoom lens (not shown) supported for movement in the forward and rearward direction on the inner side of the zoom lens barrel h is moved in the direction of its optic axis so that the focal length of the lens system is varied.

The zoom lens ring g has an outer diameter substantially equal to the diameter of the focusing lens ring d, and a toothed portion or gear i is formed over a range of about 180 degrees in a circumferential direction on an outer peripheral face of a rear end of the zoom lens ring g. An output gear of a zoom lens driving section which will be hereinafter described is held in meshing engagement with the toothed portion i.

A rear half portion j of the lens barrel b except the focusing lens ring d and the zoom lens barrel h has an outer diameter substantially equal to two thirds of an outer diameter of the focusing lens ring d and the zoom lens ring g, and has a flange portion k formed at a front end portion thereof such that it projects outwardly. The lens driving mechanism c is disposed on the upper side of the outer peripheral face of the lens barrel b rearwardly of the flange portion k.

A focusing lens driving section l for driving the focusing lens e and a zoom lens driving section m for driving the zoom lens are included in the lens driving mechanism c, and each of them includes an individual speed reducer as hereinafter described.

A focusing motor n is disposed at a location of about 45 degrees rightwardly obliquely upwards from the center of the lens barrel b on an outer peripheral face of the rear half portion j of the lens barrel b.

A zooming motor o is disposed at a position displaced a little leftwardly from just above the center of the lens barrel b on the outer peripheral face of the rear half portion j of the lens barrel b.

A gear case p accommodates therein speed reducers q and r individually for the focusing lens driving section l and the zoom lens driving section m. The gear case p is secured to a portion of an upper portion of the outer peripheral face of the rear half portion j of the lens barrel b in the proximity of the zoom lens barrel h.

The focusing motor n and the zooming motor o are secured to a support plate s which is securely mounted at a rear end portion of the gear case p such that a suitable distance may be provided between the support plate s and the gear case p.

A drive shaft t projects forwardly from the gear case p, and a pinion u is secured to a front end of the drive shaft t. The pinion u is held in meshing engagement with the toothed portion f of the focusing lens d, and the drive shaft t is rotated by the focusing motor n by way of the speed reducer q provided in the gear case p.

Another drive shaft v projects forwardly from the gear case p, and a pinion w is secured to a front end of the drive shaft v. The pinion w is held in meshing engagement with the toothed portion i of the zoom lens ring g, and the drive shaft v is rotated by the zooming motor o by way of the speed reducer r provided in the gear case p.

Thus, when the motor n of the focusing lens driving section l rotates, the focusing lens d is rotated to perform focusing, and when the motor o of the zooming lens driving section m rotates, the zoom lens ring g is rotated to perform zooming.

It is to be noted that also an iris driving section for driving an iris to open and close not shown is provided in the zoom lens apparatus a.

With the conventional zoom lens apparatus a described above, since the focusing lens driving section l, the zoom lens driving section m and so forth, which are composed of the motors n and o, the gears provided in the gear case p and so forth, are mounted in a condition wherein they project outwardly from the lens barrel b, the zoom lens apparatus a has a complicated outer profile with convexes and concaves and is bulky. Consequently, the zoom lens apparatus a is low in efficiency in storage, transportation and so forth. Besides, not only the profile of an appliance such as a video camera in which such zoom lens apparatus a is adopted is increased in size and it is difficult to handle, but also there are problems that operation sounds of the motor n and o, the gear wheels and so forth leak to the outside and are offensive to the ear of a user of the video camera and that such operation sounds are, upon photographing using the video camera, recorded.

SUMMARY OF THE INVENTION

It is an object of the present invention to provide to a zoom lens apparatus which is superior in sound insulating and dust-proof properties and is easy to handle in transportation, storage and so forth.

In order to attain the object, according to the present invention, there is provided a zoom lens apparatus, which comprises a lens system including a zoom lens set, a focusing lens set and an iris disposed on a single optic axis, a zoom lens driving section for driving the zoom lens set, a focusing lens driving section for driving the focusing lens set, an iris driving section for driving the iris to open or close, and a housing having a substantially rectangular outer profile and accommodating the lens system, zoom lens driving section, focusing lens driving section and iris driving section therein.

With the zoom lens apparatus, since the driving sections for the zoom lens set, focusing lens set and iris are accommodated, in addition to the lens system, in the housing having a substantially rectangular outer profile, convexes and concaves are little in the entire outer periphery and the bulkiness of the overall zoom lens apparatus is reduced, and the efficiency in storage and transportation is enhanced. Besides, not only this contributes to miniaturization of an apparatus which adopts this zoom lens apparatus, but also handling becomes easy and also the efficiency in production is enhanced. Furthermore, since the individual driving sections which produce operation sounds are accommodated in the housing, operation sounds which leak to the outside can be reduced.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 15 is a perspective view showing, partly cut away, a video camera in which the zoom lens apparatus of FIG. 2 is incorporated:

DETAILED DESCRIPTION OF THE PREFERRED EMBODIMENTS

Figure 2:
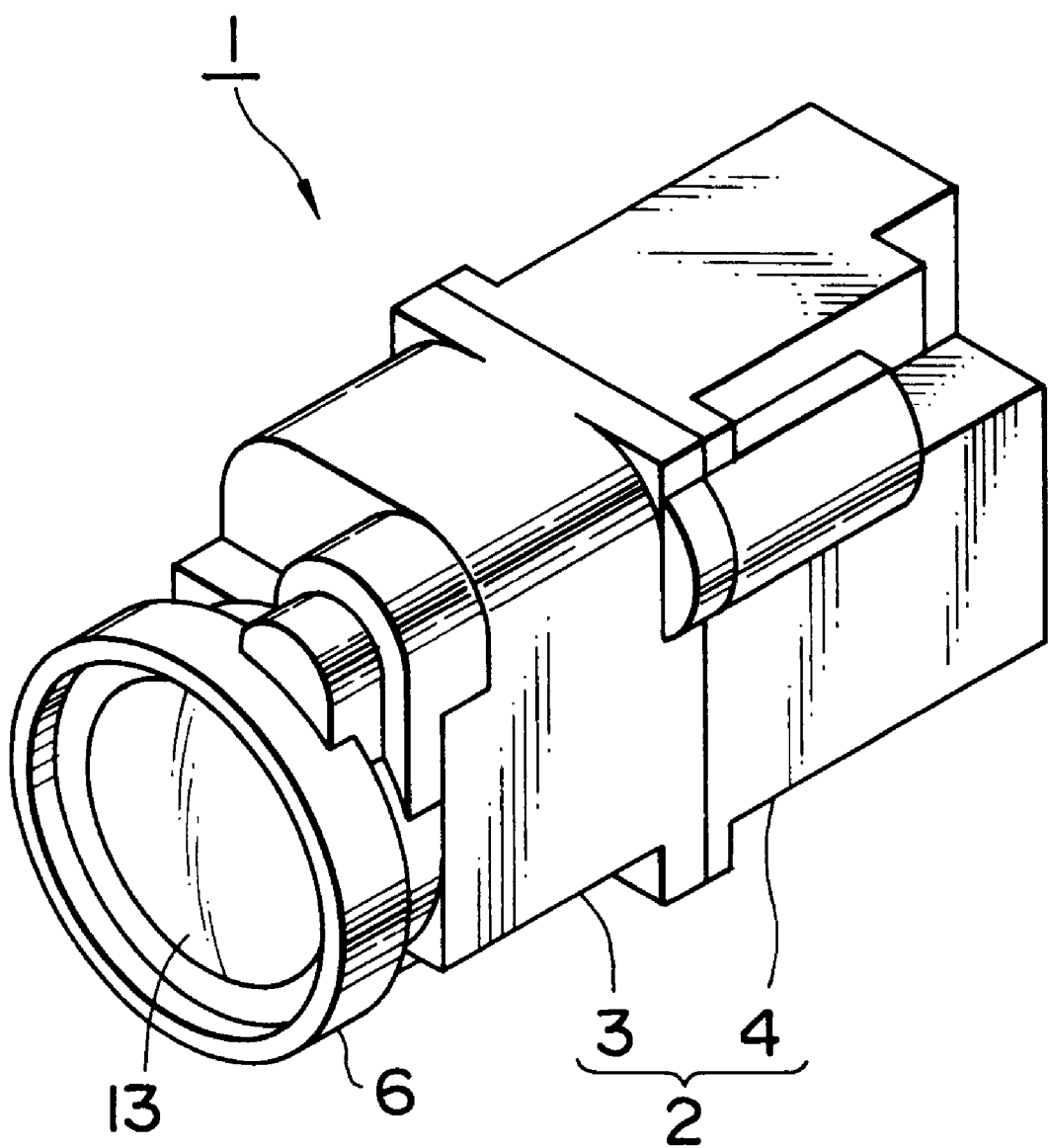
FIG. 2 is a perspective view of the zoom lens apparatus of FIG. 1 but in an assembled condition.
Figure 3:
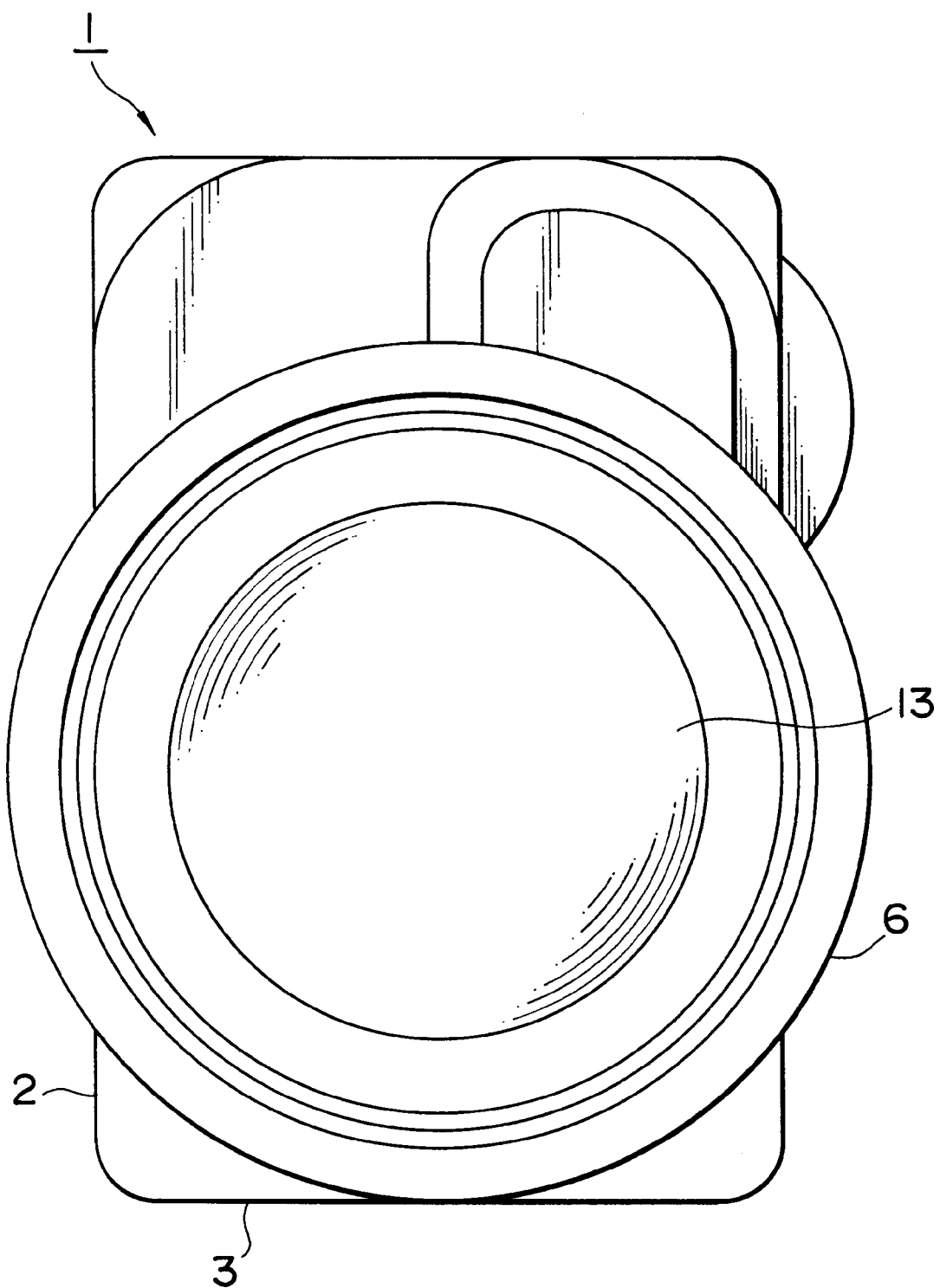
FIG. 3 is an enlarged front elevational view of the zoom lens apparatus of FIG. 2.

Referring first to FIGS. 2 and 3 there is shown a zoom lens apparatus according to a first preferred embodiment of the present invention. The zoom lens apparatus generally denoted at 1 includes a housing 2 having a substantially rectangular outer profile. The housing 2 is composed of a front half 3 and a rear half 4 each formed from a synthetic resin and coupled inseparably integrally to each other.

Figure 1:
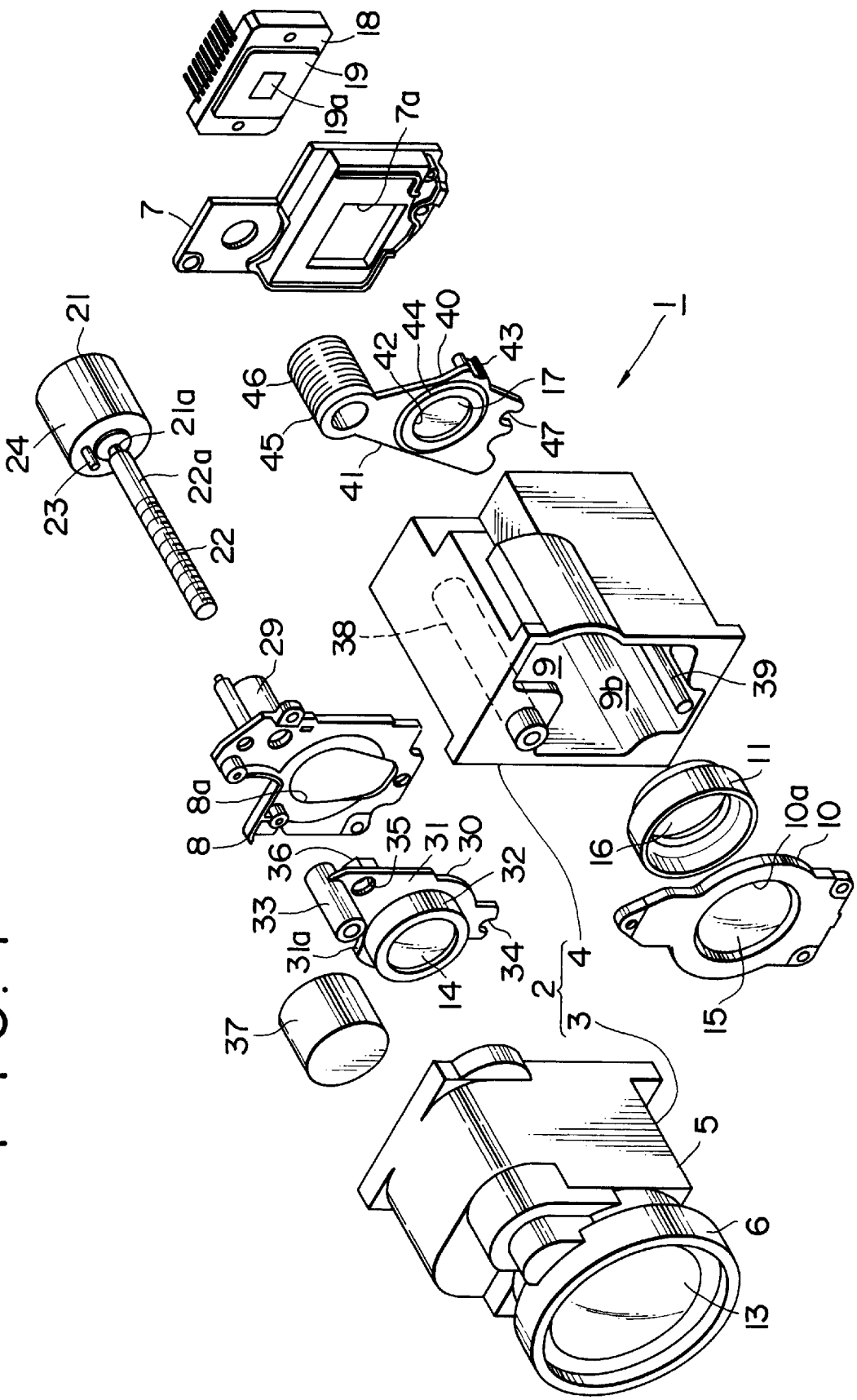
FIG. 1 is an exploded perspective view of a zoom lens apparatus showing a first preferred embodiment of the present invention.

Referring to FIGS. 1. 4 and 7, the front half 3 has a main portion 5 having a substantially vertically elongated rectangular profile both in shape as viewed in the forward or rearward direction and in shape as viewed in the leftward or rightward direction. The front half 3 further has a lens frame 6 having an annular profile and extending forwardly from a portion of a front end of the main portion 5 displaced a little downwardly. The main portion 5 and the lens frame 6 are formed in an integrated relationship with each other. A rear end face of the front half 3 is opened substantially over the entire area of the main portion 5 thereof while a front end face of the front half 3 is opened at part of the lens frame 6.

The rear half 4 has a substantially vertically elongated rectangular profile both in shape as viewed in the forward or rearward direction and in shape as viewed in the leftward or rightward direction, and a front end face and a rear end face thereof are opened over the entire areas thereof.

Figure 7:
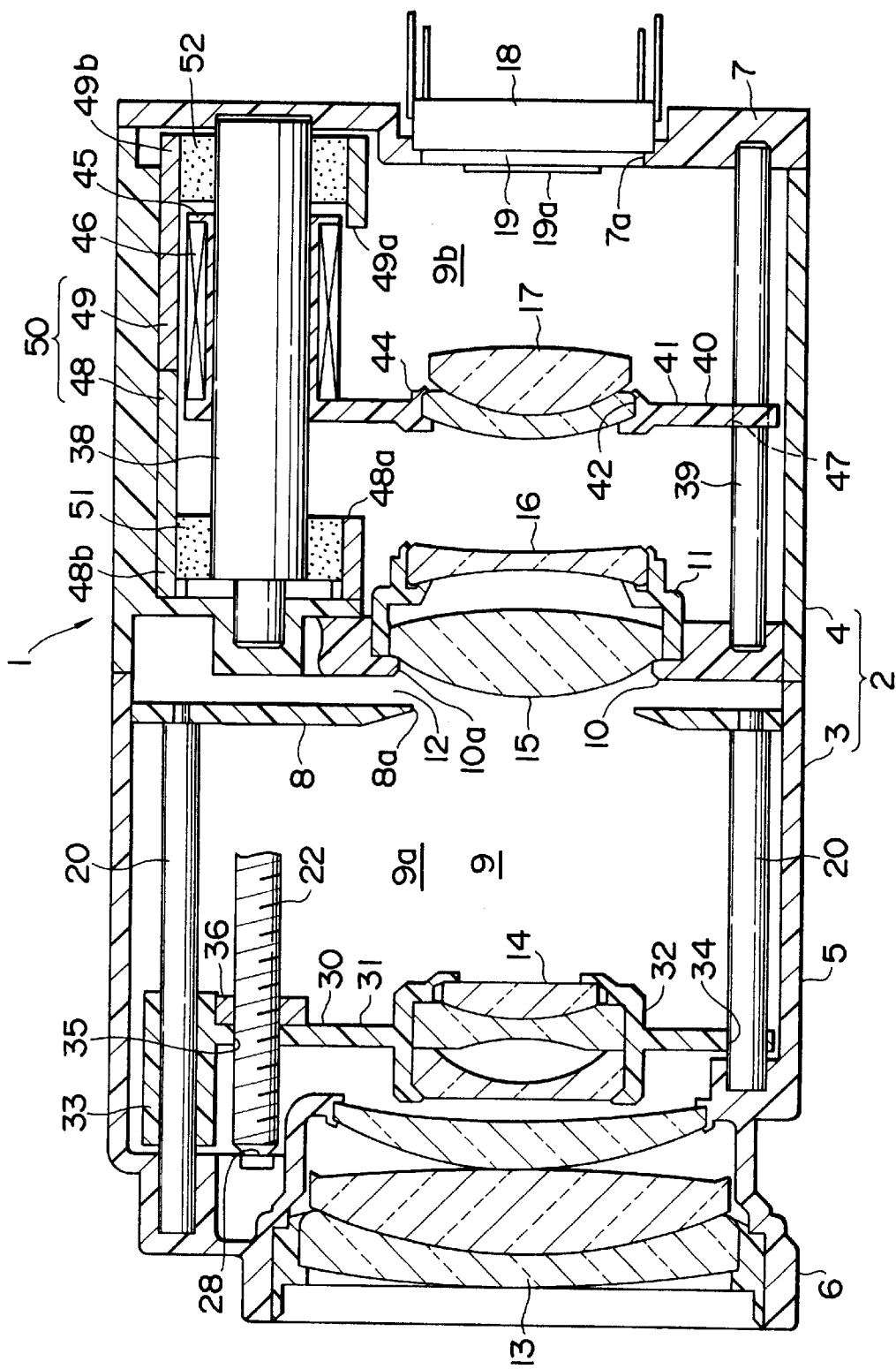
FIG. 7 is a sectional view taken along line VII— VII of FIG. 6.
Figure 8:
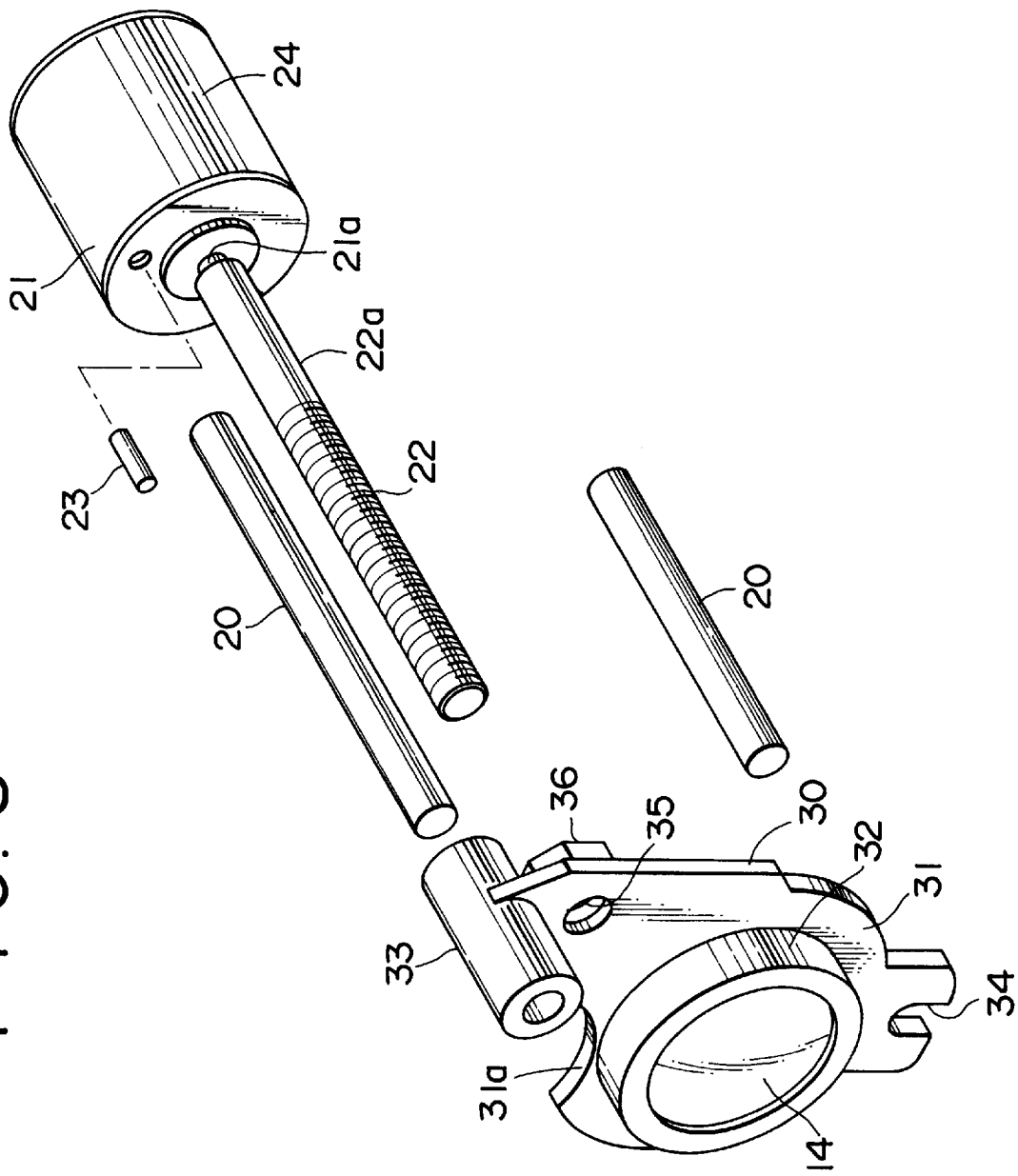
FIG. 8 is an enlarged exploded perspective view showing a zooming lens driving section of the zoom lens apparatus of FIG. 2.

Refer to FIGS. 1 and 7, a rear face plate 7 covers over the rear end face of the rear half 4, and a rectangular window 7a is formed at a portion of the rear face plate 7 displaced a little downwardly from the center.

The front half 3 and the rear half 4 are screwed to each other such that the rear end face of the front half 3 and the front end face of the rear half 4 are abutted with each other, thereby forming the housing 2.

A partition wall 8 is secured between the front and rear halves 3 and 4 coupled to each other, and a spacing 9 in the housing 2 is partitioned by the partition wall 8 into a front portion 9a and a rear portion 9b. An opening 8a is formed in the partition wall 8.

A support wall 10 is secured to the rear half 4 such that it is positioned in an overlapping relationship behind the partition wall 8, and a circular support hole 10a is formed at a portion of the support wall 10 displaced a little downwardly. A front end portion of a short cylindrical lens holding tube 11 is secured to a rear face of the support wall 10 such that an axis thereof coincides with a center axis of the support hole 10a of the support wall 10.

Thus, the lens frame 6, the opening 8a of the partition wall 8, the support hole 10a of the support wall 10, the lens holding tube 11 and the window 7a of the rear face plate 7 are positioned on a single common axis.

Further, a spacing 12 having a small dimension in the forward and rearward direction is formed between the partition wall 8 and the support wall 10, and iris blades not shown of an iris not shown are disposed in the spacing 12.

Figure 4:
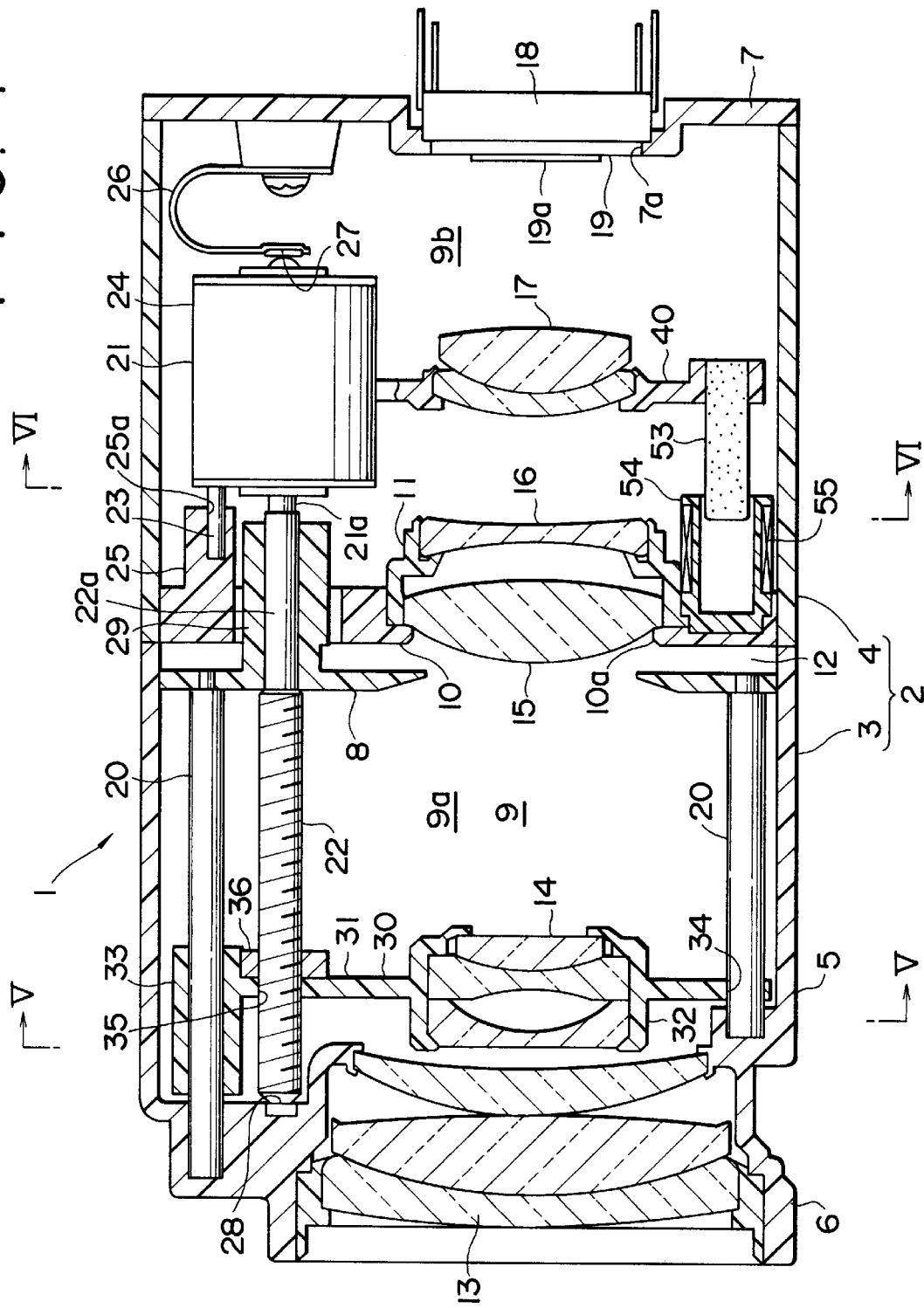
FIG. 4 is an enlarged vertical sectional view of the zoom lens apparatus of FIG. 2 taken along line IV—IV of FIG. 6.
Figure 5:
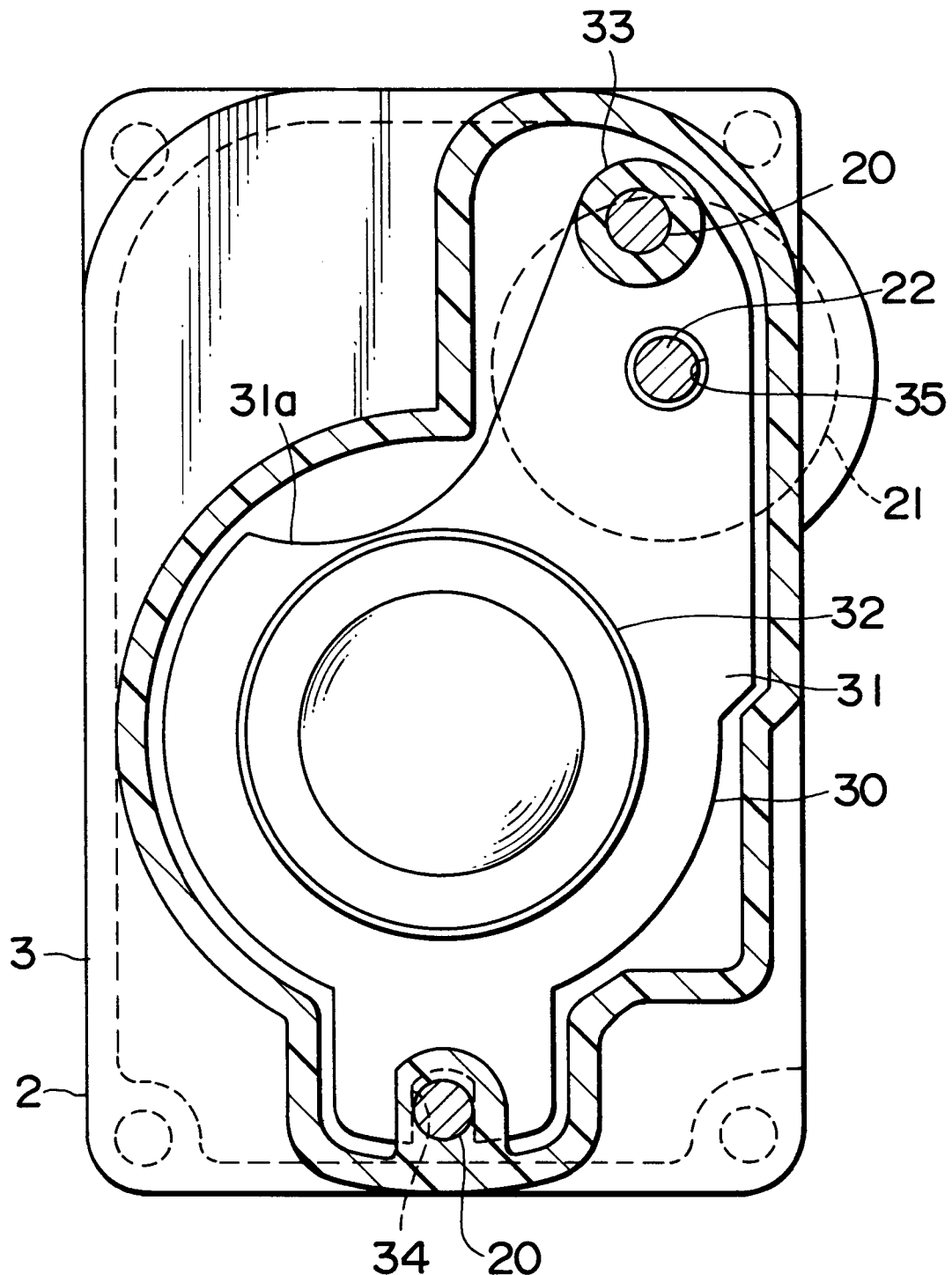
FIG. 5 is a sectional view taken along line V—V of FIG. 4.

A plurality of lens sets 13, 14, 15, 16 and 17 are disposed in the zoom lens apparatus 1. Referring to FIGS. 1, 4 and 7, the forwardmost lens set 13 is held in an inwardly fitted condition on the lens frame 6 of the front half 3 while the third and fourth lens sets 15 and 16 from the front are held in an inwardly fitted condition on the lens holding tube 11 supported on the support wall 10. Meanwhile, the second lens set 14 from the front is a zoom lens set, that is, a lens set for adjustment of an angle of field while the rearmost lens set 17 is a focusing lens set, that is, a lens set for focusing, and the zoom lens set 14 and the focusing lens set 17 are individually held on separate forwardly and rearwardly movable lens holding members which will be hereinafter described.

It is to be noted that the lens sets 13, 14, 15, 16 and 17 are disposed such that optical axes thereof may coincide with each other, and each of the lens sets 13 to 17 except the third and fourth lens sets 15 and 16 is composed of a plurality of lenses joined to each other.

An imaging element 19 in the form of a CCD image sensor is mounted on a front face of an imaging element holder 18. The imaging element holder 18 is supported on the rear face of the rear half 4 such that the imaging element 19 thereon faces forwardly through the window 7a formed in the rear face plate 7 of the rear half 4. A light receiving face 19a of the imaging element 19 is disposed on the optic axis of the lens system consisting of the lens sets 13, 14, 15, 16 and 17 behind the focusing lens set 17.

Thus, light from the outside successively passes through the lens sets 13, 14, 15, 16 and 17 and is received by the light receiving face 19a of the imaging element 19.

Referring to FIGS. 1 and 4 to 8, a pair of cylindrical guide rods 20 are supported at a substantially central portion in the leftward and rightward direction of a lower end portion and a rightwardly displaced portion of an upper end portion of the front side spacing 9a of the housing 2 such that they extend forwardly and rearwardly between the front face wall of the front half 3 and the partition wall 8.

The zoom lens set 14 is connected to be driven by a motor 21. A ball screw 22 is securely connected to a front end of a rotary shaft 21a of the motor 21.

A support pin 23 extends from a front end of a casing 24 of the motor 21 and is fitted in a support hole 25a formed in and opened to a rear face of a projection 25, which extends rearwardly from a rightwardly displaced portion of an upper end portion of the support wall 10. The motor 21 is thus supported on the support wall 10 by way of the support pin 23 and the projection 25.

A holding element 26 in the form of a leaf spring having a substantially inverted U shape as viewed from a side is secured at a rear side lower end portion thereof to a front end portion of a projection extending forwardly from a rightwardly displaced portion of an upper portion of the rear face plate 7. A front side lower end portion of the holding element 26 is positioned on an extension line of the rotary shaft 21a of the motor 21.

A thrust receiver 27 made of a material having a high slipping property such nylon is secured to a front face of the front side lower end portion of the holding element 26. The thrust receiver 27 is held in resilient contact with a rear end of the rotary shaft 21a of the motor 21 extending rearwardly from the casing 24 thereby to prevent letting off of the support pin 23 from the support hole 25a of the projection 25 of the support wall 10.

Another thrust receiver 28 similar to the thrust receiver 27 is secured to a rightwardly displaced portion of a rear face of an upper end portion of the front face wall of the front half 3 such that the ball screw 22 is abutted at a front end thereof with the thrust receiver 28.

A cylindrical bearing 29 extends rearwardly from a rightwardly displaced portion of the upper end portion of the partition wall 8, and a column portion 22a which is a rear end portion of the ball screw 22 is supported for rotation on the bearing 29.

A lens holding member 30 has a main portion 31 in the form of a generally flat plate, a lens holding tube 32 in the form of a cylinder having a comparatively great diameter and a support tube 33 in the form of a cylinder having a comparatively small diameter. The main portion 31, the lens holding tube 32 and the support tube 33 are formed in an integrated relationship with each other. A left side portion 31a of an upper end portion of the main portion 31 of the lens holding member 30 is cut away over a great extent as particularly seen in FIG. 5.

A recess 34 is formed at the center of a lower end edge of the main portion 31 of the lens holding member 30 and is held in engagement for sliding movement with a lower one of the guide rods 20, and the support tube 33 of the lens holding member 30 is fitted outwardly for sliding movement on the lower guide rod 20 so that the lens holding member 30 is supported for movement in the forward and rearward direction in the front side spacing 9a of the housing 2. The zoom lens set 14 is held on the lens holding tube 32 of the lens holding member 30.

A mounting hole 35 is formed at a portion of the main portion 31 immediately below the support tube 33, and a nut member 36 is secured adjacent the mounting hole 35 to the main portion 31 of the lens holding member 30 and the ball screw 22 is screwed in the nut member 36. Accordingly, when the motor 21 rotates, the nut member 36 is fed by the ball screw 22 which is rotated by the motor 21, and consequently, the lens holding member 30 is moved in the forward or rearward direction. Since the zoom lens set 14 is moved in the forward or rearward direction integrally with the lens holding member 30, zooming is performed thereby.

An iris driving motor 37 is secured to a left side front face of the upper end portion of the partition wall 8 such that it is disposed at a left upper portion of the front spacing 9a of the housing 2. The iris blades not shown disposed in the spacing 12 (FIG. 7) are driven to open or close by the iris driving motor 37. It is to be noted that the iris mechanism which is opened or closed by the motor 37 need not be a specific one but may be a known one, and therefore, illustration and detailed description thereof are omitted herein.

It is to be noted that, since the recess 31a of the lens holding member 30 corresponds to the iris motor 37, the iris motor 37 does not make an obstacle to movement of the lens holding-member 30.

A guide rod 38 supports a coil bobbin which will be hereinafter described for movement thereon. The guide rod 38 has a cylindrical profile and is made of a material having a high permeability. The guide rod 38 is supported on and extends between the support wall 10 and the rear face plate 7 of the rear half 4 in the forward and rearward direction, that is, in a direction parallel to the optic axis of the lens system described above. The guide rod 38 is disposed at a left upper portion of the rear spacing 9b of the housing 2.

An auxiliary guide rod 39 having a cylindrical profile is provided to hold a posture of a lens holding member for the focusing lens set which will be hereinafter described. A front end portion of the auxiliary guide rod 39 is supported at a portion of the support wall 10 displaced to a lower end portion. Consequently, the auxiliary guide rod 39 is disposed at the center of the lower end portion of the rear spacing 9b of the housing 2 and extends in parallel to the guide rod 38.

A lens holding member 40 holds the focusing lens set 17 thereon and has a main portion 41 in the form of a flat plate. A large circular holding hole 42 is formed at a portion of the main portion 41 of the lens holding member 40 displaced to a lower end, and a plurality of holding pieces 43 each in the form of lateral tabs are formed on and extend rearwardly from an opening edge of the holding hole 42. Thus, a lens holding portion 44 is formed from the holding hole 42 and the holding pieces 43, and the focusing lens set 17 is supported on the lens holding portion 44.

A cylindrical coil bobbin 45 is formed integrally at and extends rearwardly from a leftwardly displaced portion of an upper end portion of the main portion 41 of the lens holding member 40, and a movable coil 46 is wound on the boil bobbin 45. A recess 47 is formed at the center of a lower end portion of the main portion 41 of the lens holding member 40. The coil bobbin 45 is fitted outwardly for sliding movement on the guide rod 38, and the recess 47 is held in engagement for sliding movement with the auxiliary guide rod 39.

Figure 6:
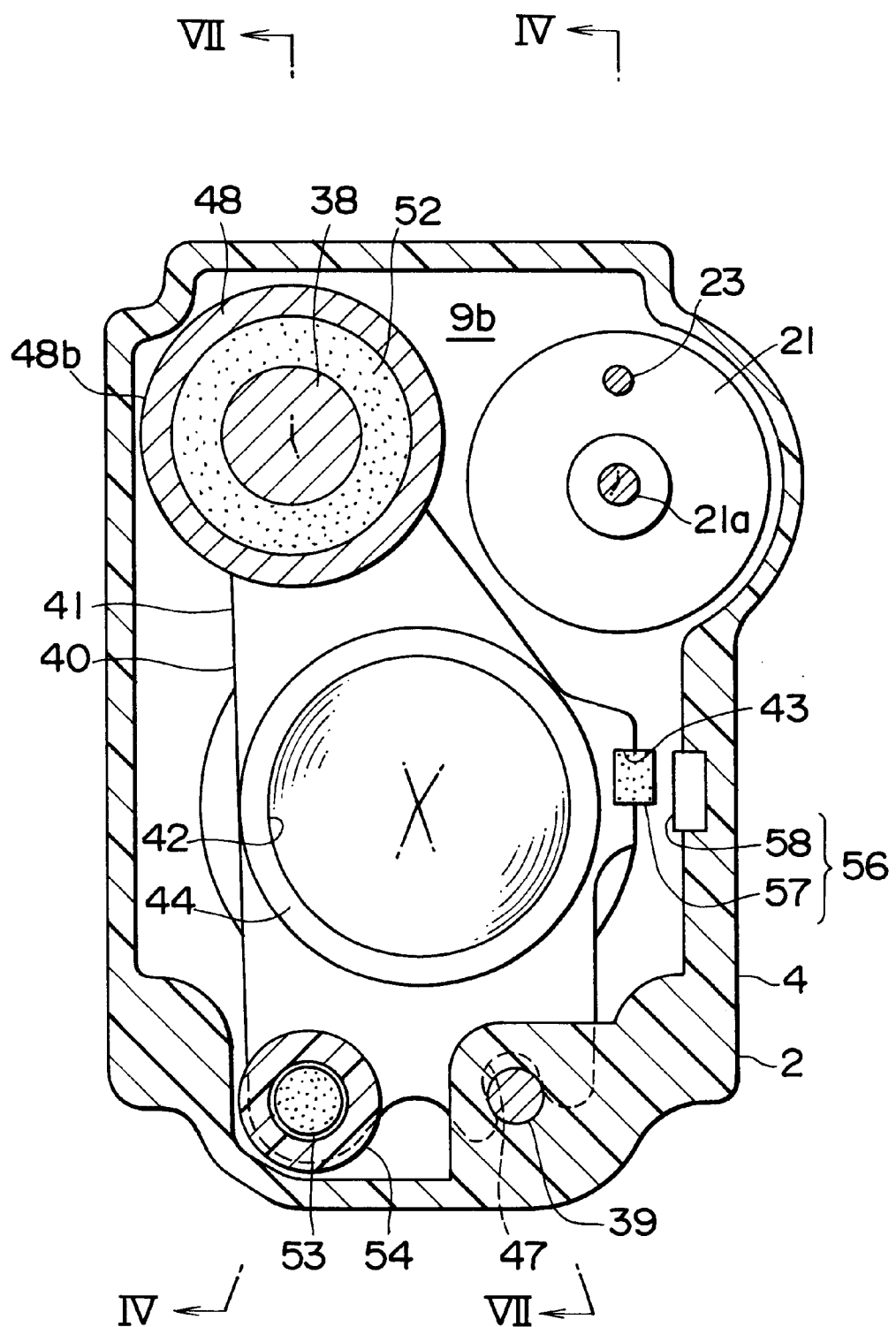
FIG. 6 is a sectional view taken along line VI—VI of FIG. 4.
Figure 9:
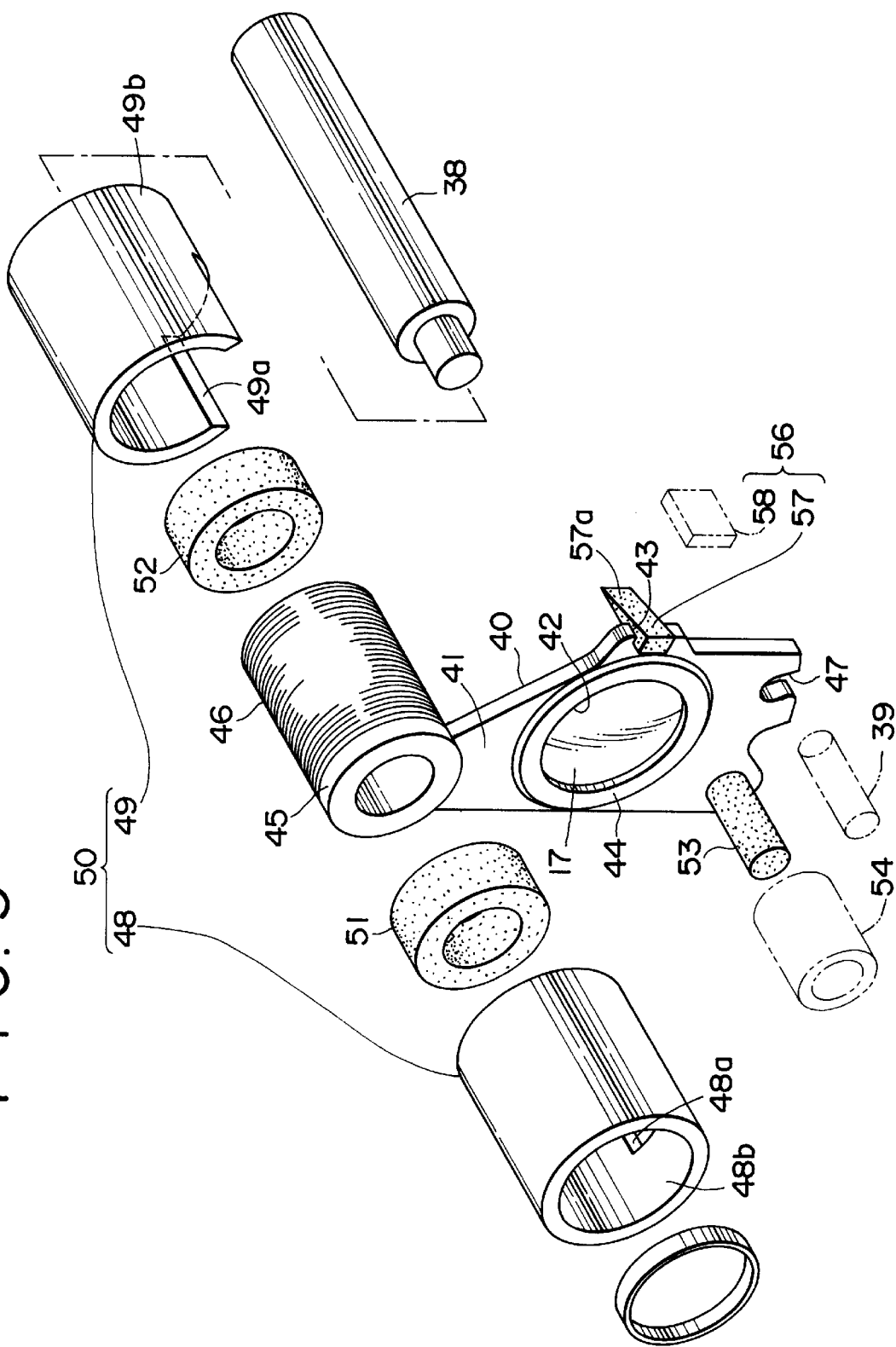
FIG. 9 is a similar view but showing a focusing lens driving section of the zoom lens apparatus of FIG. 2.

Referring now to FIGS. 6, 7 and 9, a pair of yoke bodies 48 and 49 are provided. Each of the yoke bodies 48 and 49 is in the form of a thin cylinder having such a profile that part thereof in a circumferential direction is removed except an end portion thereof. The yoke body 48 is secured to the rear half 4 and the support wall 10 and is positioned at a front half portion of a left upper portion of the spacing 9b in such orientation that an annular portion 48b at which the recess 48a is not formed may be directed to the front side. The other yoke body 49 is secured to the rear half 4 and is positioned at a rear half portion of the left upper portion of the spacing 9b in such orientation that an annular portion 49b thereof at which the recess 49a is not formed may be directed to the rear side. The yoke bodies 48 and 49 are abutted with each other at a rear end and a front end thereof, respectively, thereby to generally form an outer yoke 50 wherein the annular portions 48b and 49b are positioned forwardly and rearwardly and the recesses 48a and 49a are directed downwardly.

A pair of magnets 51 and 52 each in the form of a thick annular ring are provided. The magnet 51 is secured in an inwardly fitted condition to the front side annular portion 48b of the outer yoke 50 and is further secured in an outwardly fitted condition to a front end portion of the guide rod 38. Meanwhile, the other magnet 52 is secured in an inwardly fitted condition to the rear side annular portion 49b of the outer yoke 50 and is further-secured in an outwardly fitted condition to a rear end portion of the the guide rod 38. Thus, a closed magnetic path is formed from the guide rod 38, the outer yoke 50 and the magnets 51 and 52, and the movable coil 46 is positioned in the closed magnetic path.

Accordingly, when the movable coil 46 is energized, it is moved in the forward or rearward direction under the guidance of the guide rod 38, and consequently, the focusing lens holding member 40 is moved in the forward or rearward direction under the guidance of the guide rod 38 and the auxiliary guide rod 39. Consequently, the focusing lens set 17 is moved in the forward or rearward direction, that is, in the direction of the optic axis of the lens system, thereby to perform focusing.

A detecting magnet 53 having a round rod-like profile extends forwardly from a left lower portion of the lens holding member 40, and a cylindrical tubular portion 54 extends rearwardly from a left lower portion of a rear face of the support wall 10. A tubular detecting coil 55 is wound on an outer peripheral face of the tubular portion 54 of the support wall 10. A front end portion of the detecting magnetic 53 of the lens holding member 40 is positioned in the inside of the tubular portion 54.

When the lens holding member 40 moves, the detecting magnet 53 is moved integrally therewith, and consequently, an electric current of a value corresponding to a speed of the movement flows through the detecting coil 55. The speed of movement of the lens holding member 40 is detected by detecting the value of the electric current then.

An inclined magnet 57 is mounted on the lens holding member 40 while a Hall effect element 58 is mounted on an inner face of the rear half 4, and the inclined magnet 57 and the Hall effect element 58 cooperate to form position detecting means for detecting a position of the focusing lens holding member 40, or in other words, a position of the focusing lens set 17.

More particularly, the inclined magnet 57 has a rectangular sectional shape taken perpendicularly to its longitudinal direction and is mounted at a mid portion of a right side face of the lens holding member 40 in the upward and downward direction in such orientation that an inclined face 57a thereof is directed to the outer side, that is, to a right inner side face of the rear half 4. Meanwhile, the Hall effect element 58 is of the linear type and is mounted on the right inner side face of the rear half 4 in an opposing relationship to the inclined face 57a of the inclined magnet 57. Accordingly, if the focusing lens holding member 40 moves, then the distance between the inclined magnet 57 and the Hall effect element 58 is varied so that the density of magnetic fluxes emerging from the inclined magnet 57 and acting on the Hall effect element 58 is varied, and consequently, a voltage of a value corresponding to a magnetic flux density then is outputted from the Hall effect element 58 and a position of the lens holding member 40 is detected by detecting the voltage.

Subsequently, an apparent volume of the housing 2, that is, a volume when it is assumed that the internal spacing is solid (filled with substance), is calculated.

Figure 10:
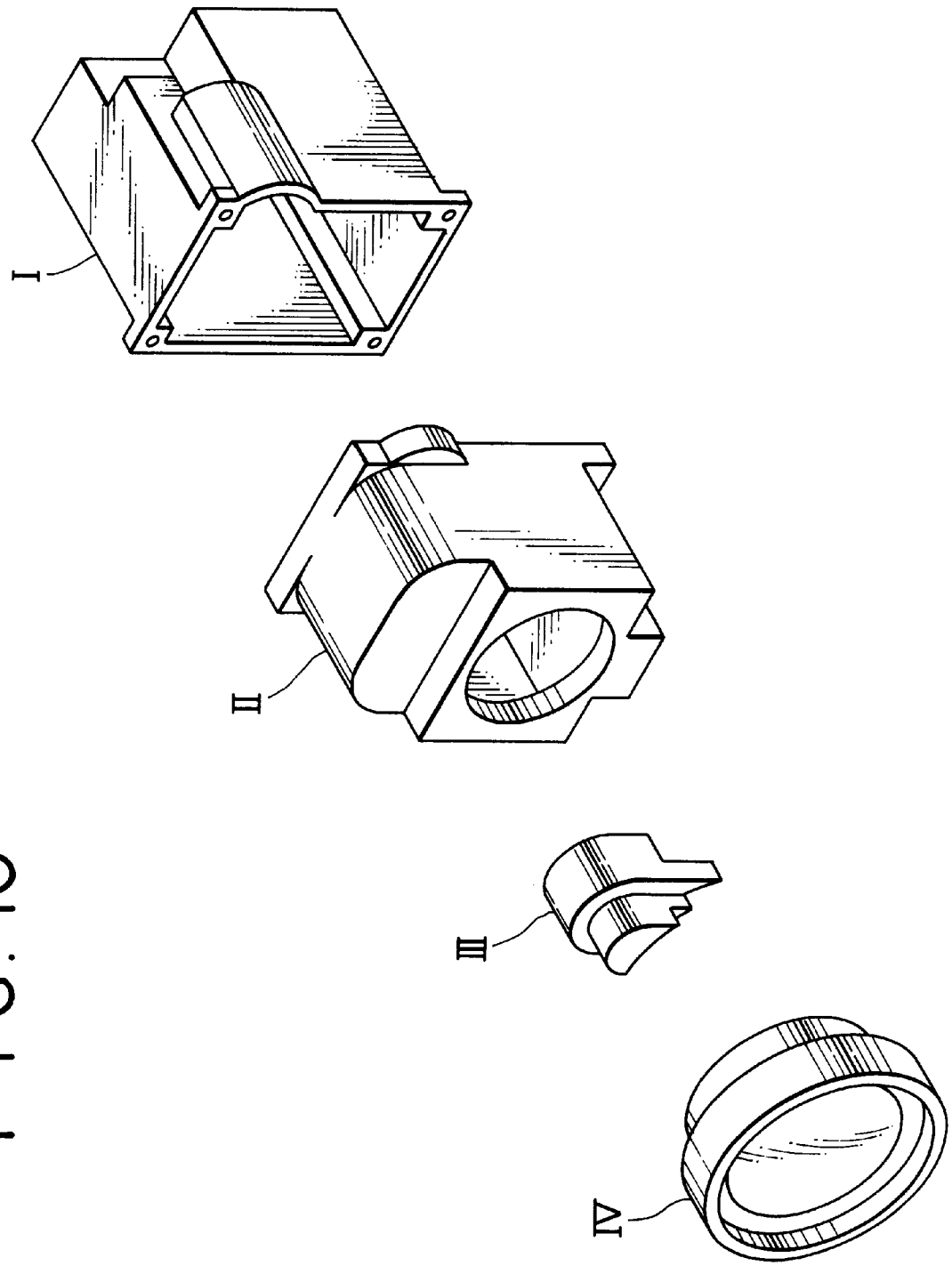
FIG. 10 is a similar view but showing a housing divided into four portions for convenience in order to facilitate calculation of an apparent volume of the housing.
Figure 11:
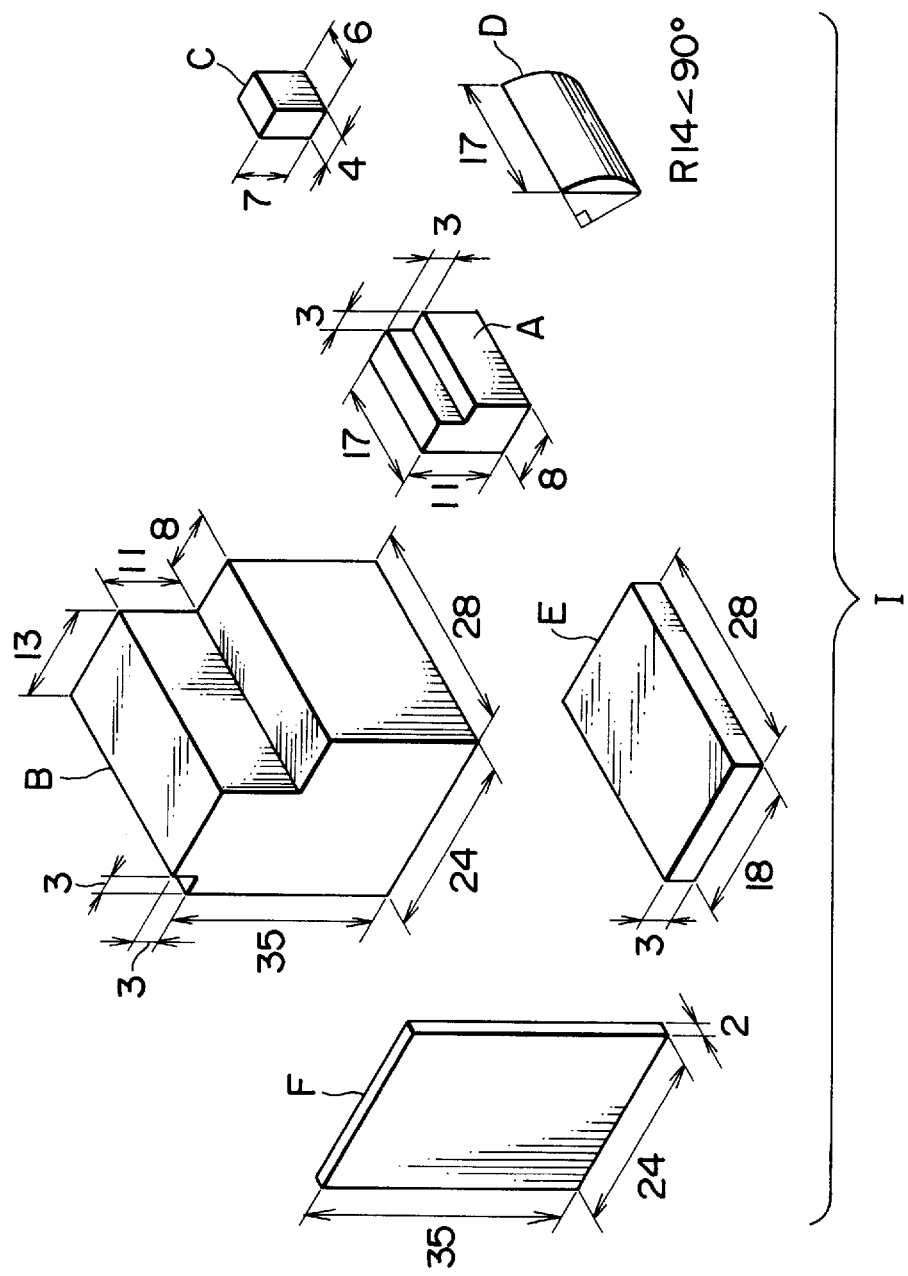
FIG. 11 is a perspective view showing a first one of the four portions of FIG. 10 but further divided into 6 pieces together with dimensions.
Figure 12:
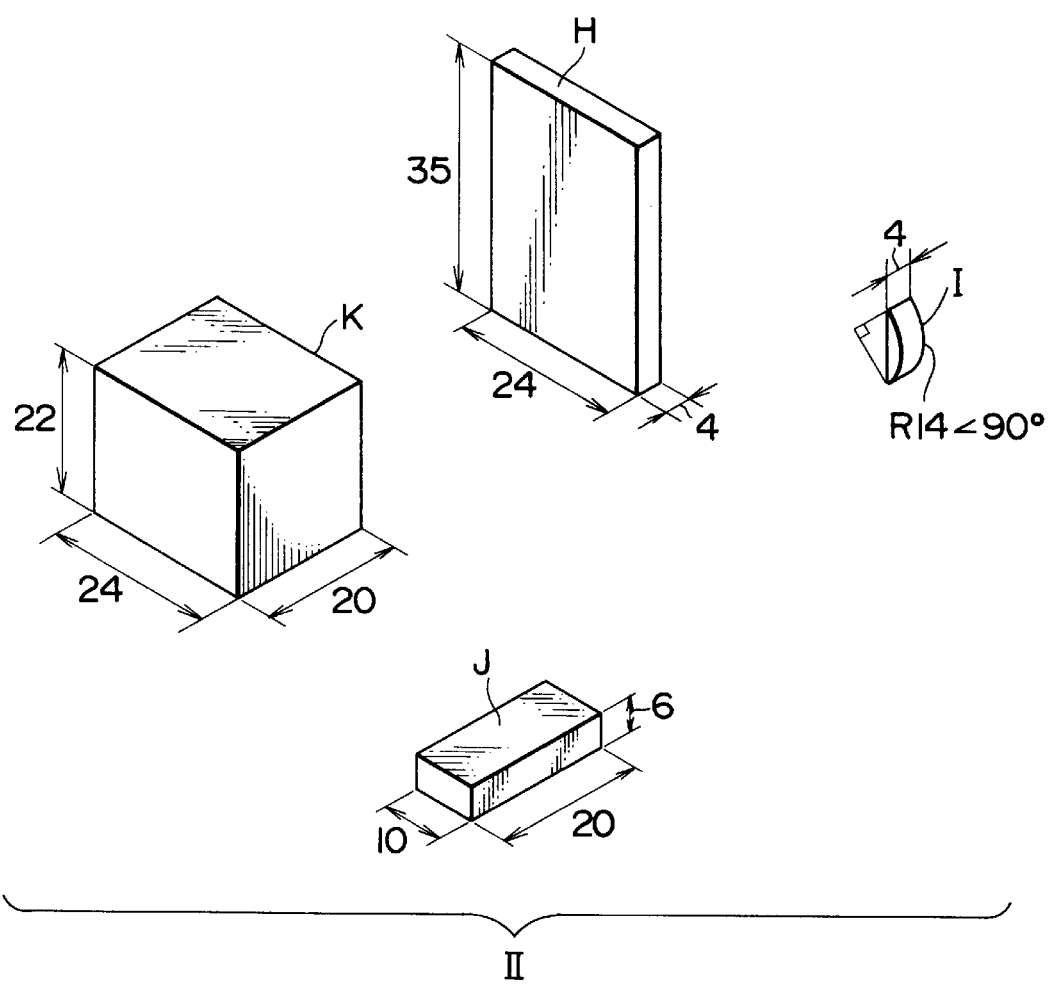
FIG. 12 is a similar-view but showing a second one of the four portions of FIG. 10 but further divided into 5 pieces together with dimensions.
Figure 13:
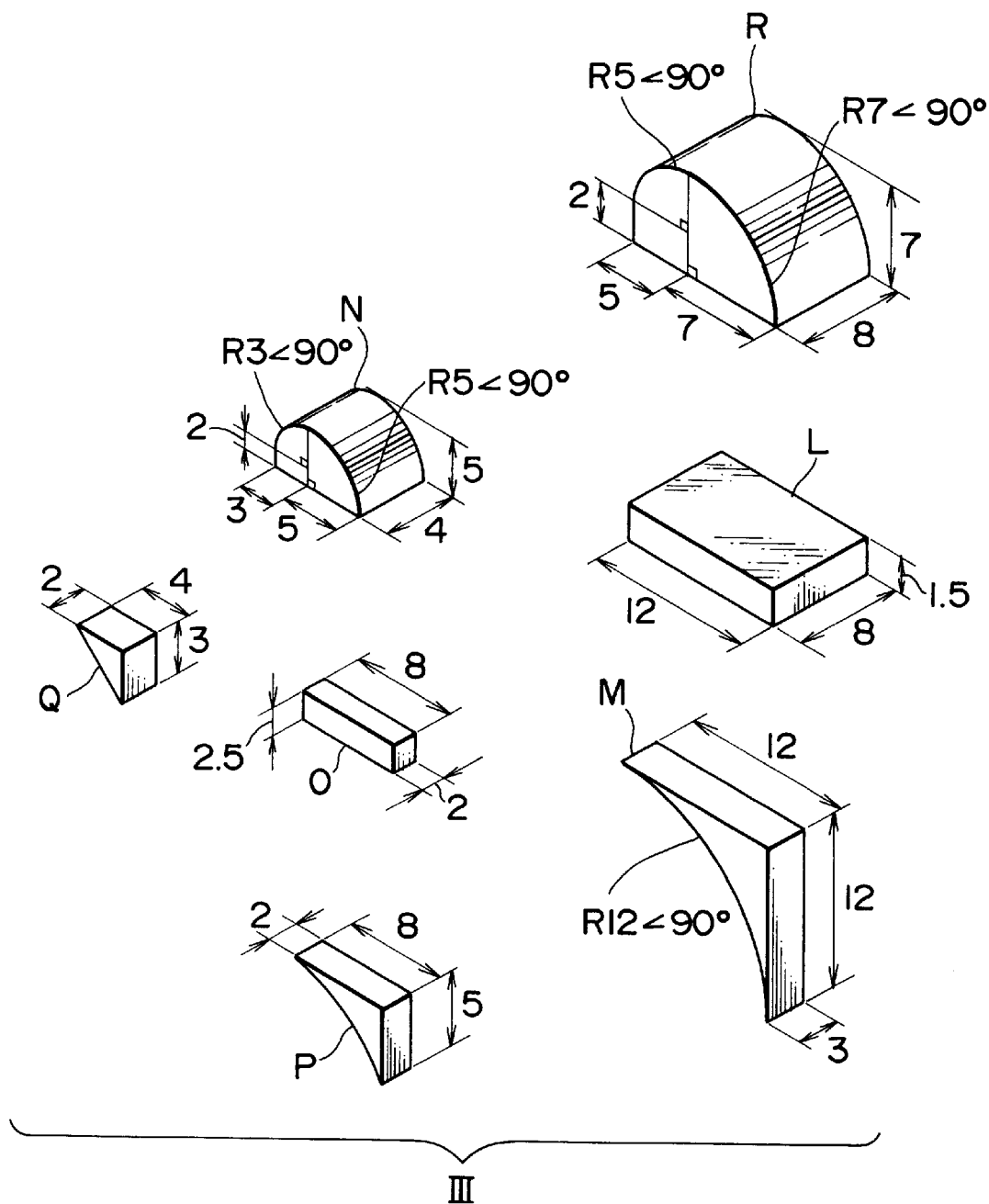
FIG. 13 is a similar view but showing a third one of the four portions of FIG. 10 but further divided into 7 pieces together with dimensions.
Figure 14:
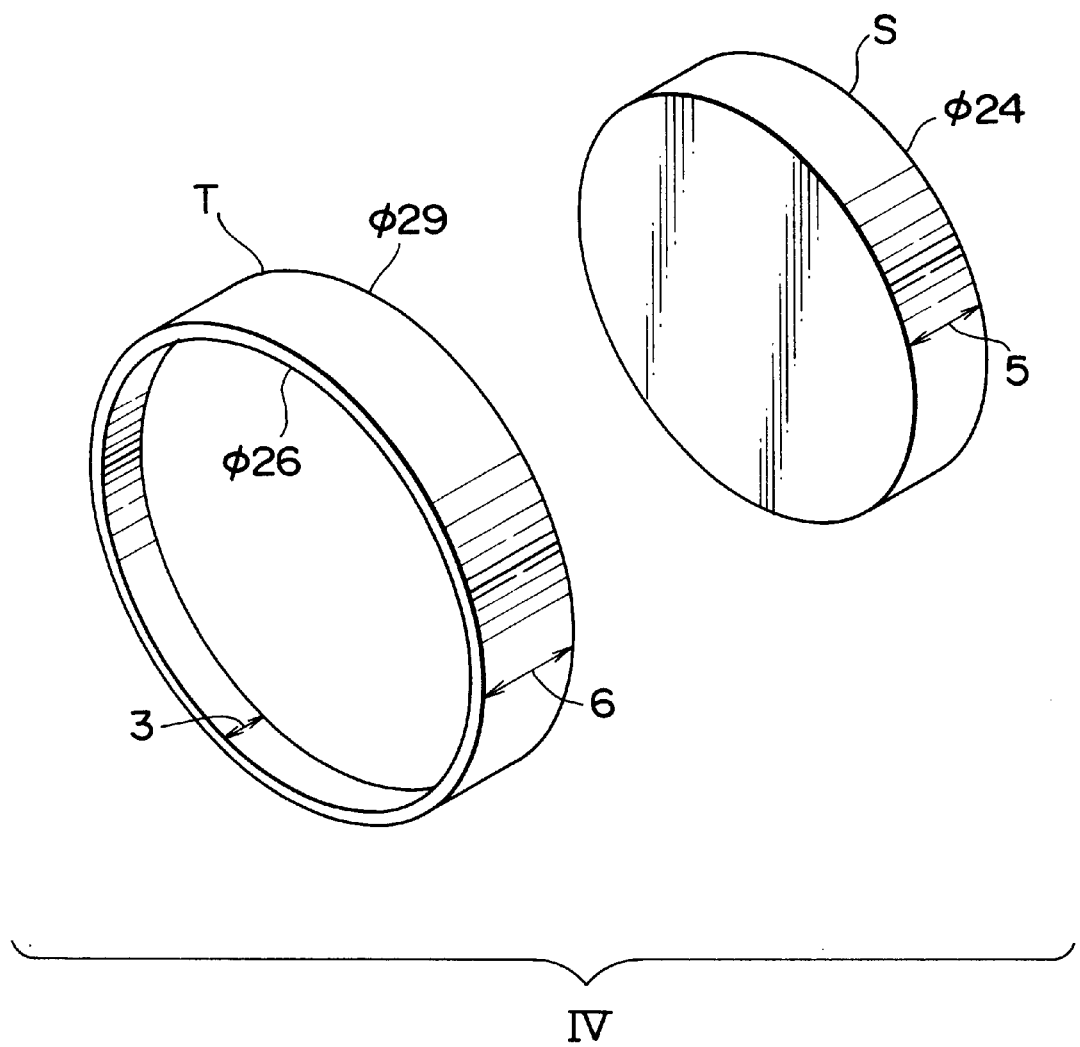
FIG. 14 is a similar view but showing a fourth one of the four portions of FIG. 10 but further divided into 2 block pieces together with dimensions.

In order to facilitate calculation, an outer profile of the housing is first simplified, that is divided into four portions I, II, III and IV as shown in FIG. 10, and then they are further divided into a total of twenty block pieces A to T as shown in FIGS. 11 to 14 and volumes are calculated with regard to the block pieces A to F, G to K, L to R, and S and T of the four pieces I, II, III and IV, respectively. After then, a sum total of the volumes is calculated. It is to be noted that, in FIGS. 11 to 14, dimensions of the block pieces A to T are additionally applied individually in the unit of mm, and Rn represents that the radius is n mm while $\phi n°$ represents that the central angle is n degrees.

Referring to FIGS. 11 to 14, block piece A=(11 ×8−3× 3)×17=1.343 (mm$^3$): block piece B=(35×24−3×3−11×8)× 28=20.804 (mm$^3$): block piece C =7×4×6=168 (mm$^3$): block piece D=($\pi$×14×14×¼−14×14×½)×17=949.62 (mm$^3$): block piece E =3×18×28=1.512 (mm$^3$): block piece F=35×24×2 =1,680 (mm$^3$): block piece G=($\pi$×7×7×½+7×10)×15=

2.203.95 (mm³): block piece H=35×24×4=3,360 (mm³): block piece I=(π×14×14×¼−14×14×½)×4=223.44 (mm³) : block piece J=6×10×20=1,200 (mm³): block piece K=22× 24×20=10.560 (mm³): block piece L=1.5×12×3=54 (mm³): block piece M=(12×12−π×12×12×¼)×3=92.88 (mm³): block piece N=(π5×5×¼+π×3×3×¼+2×3)×4=130.76 (mm³): block piece 0=2.5×8 ×2=40 (mm³): block piece P=5×8×½×2=40 (mm³): block piece Q=4×3×½×2=12 (mm³): block piece R=(π×7×7×¼+−π×5×5×¼+2×5)×8= 544.72 (mm³): block piece S=π×(24/2)×(24/2)×5=2,260.8 (mm³): and block piece T=π×(29/2)×(29/2)×6−π×(26/2)× (26/2)×3=2.369.13 (mm³), and a sum total of them is 49.548.3 (mm³), that is, 49.5483 cc. which is less than 50 cc.

FIG. 15 schematically shows a video camera 59 in which the zoom lens apparatus 1 described above is incorporated. The video camera 59 has a viewfinder 60. Since the housing 2 has a substantially rectangular outer profile as described hereinabove, it can be accommodated well in the video camera 59 and a case body 61 of the video camera 59 has a neat outer profile.

Further, if the zoom lens apparatus 1 and the viewfinder 60 are disposed such that the optic axes thereof substantially coincide with each other, then only if the viewfinder 60 is viewed, then the line of sight is substantially directed to an object for photographing, and an unfamiliar feeling which may otherwise arise from a difference between a line of sight of the camera and the line of sight can be eliminated.

Figure 16:
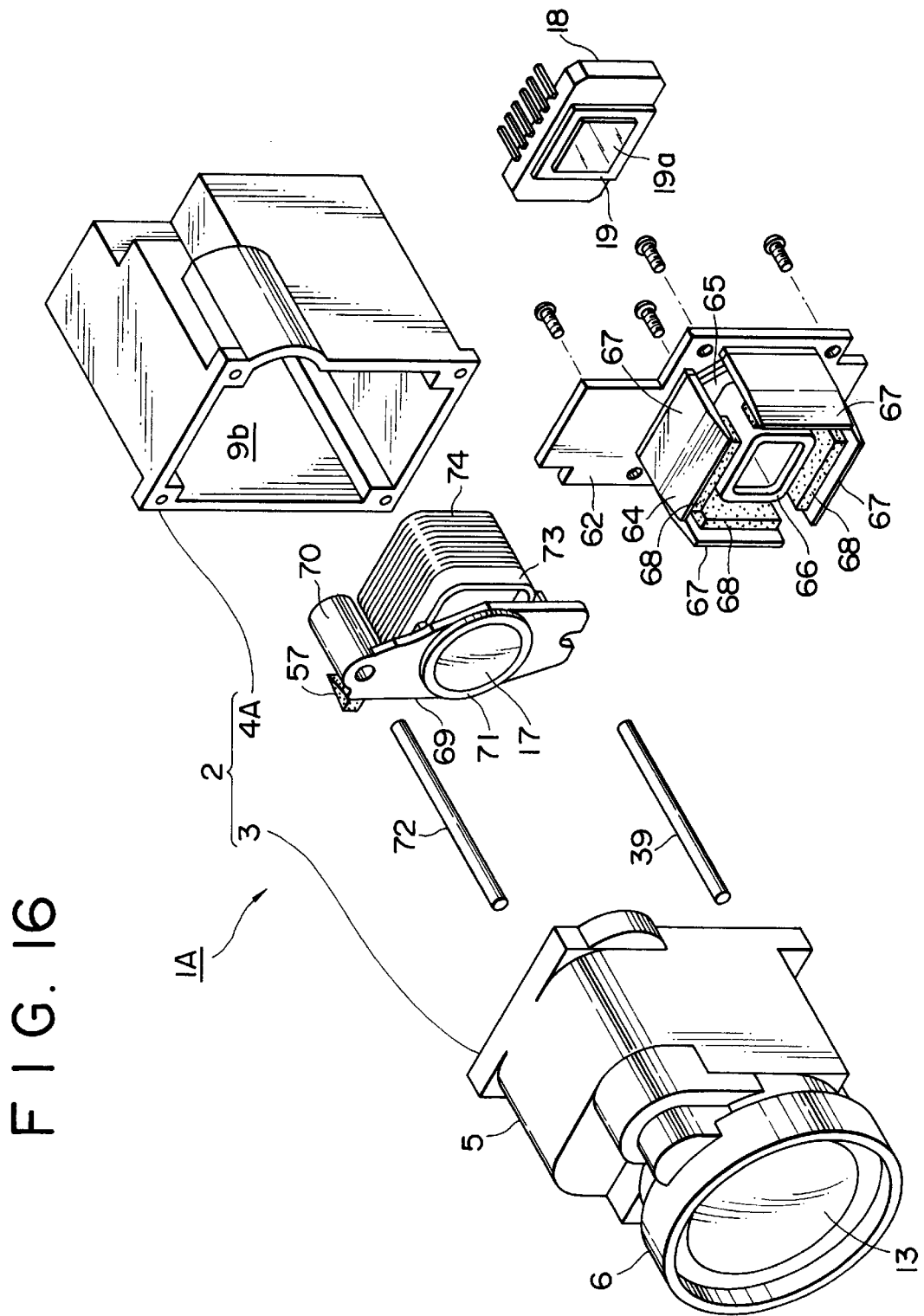
FIG. 16 is an exploded perspective view of a zoom lens apparatus showing a second preferred embodiment of the present invention.
Figure 17:
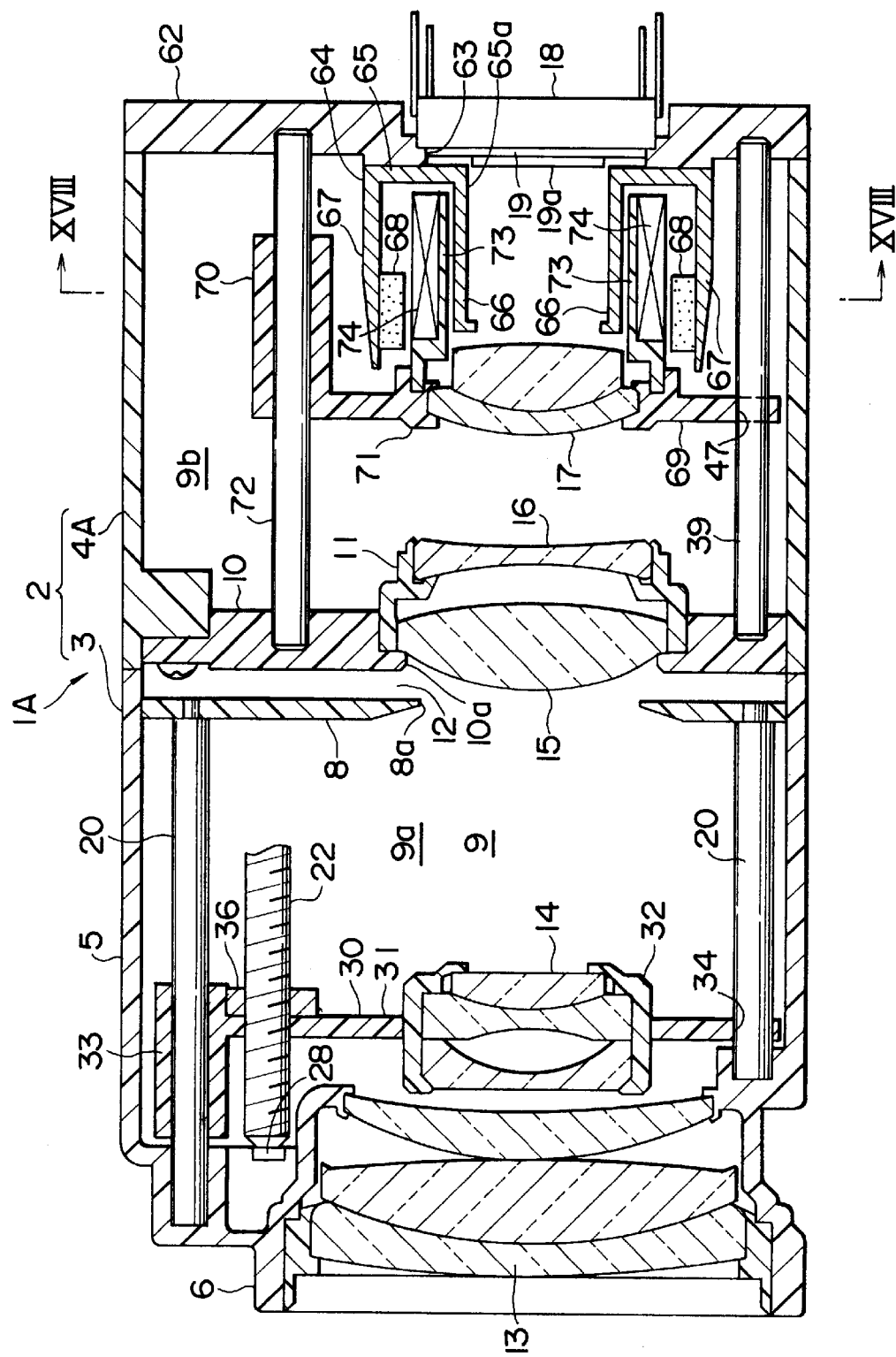
FIG. 17 is a vertical sectional view of the zoom lens apparatus of FIG. 16.
Figure 18:
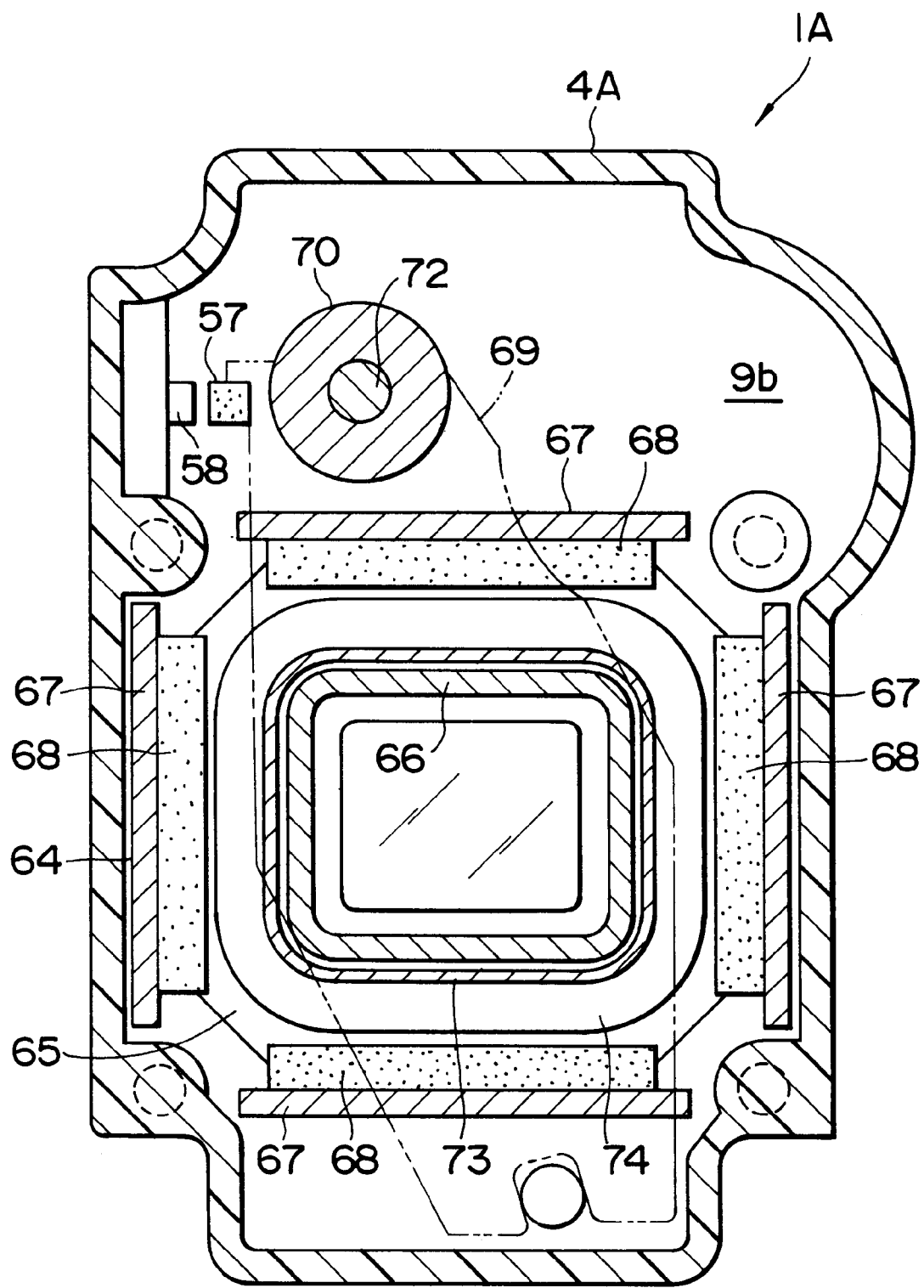
FIG. 18 is an enlarged sectional view taken along line XVIII—XVIII of FIG. 17.
Figure 19:
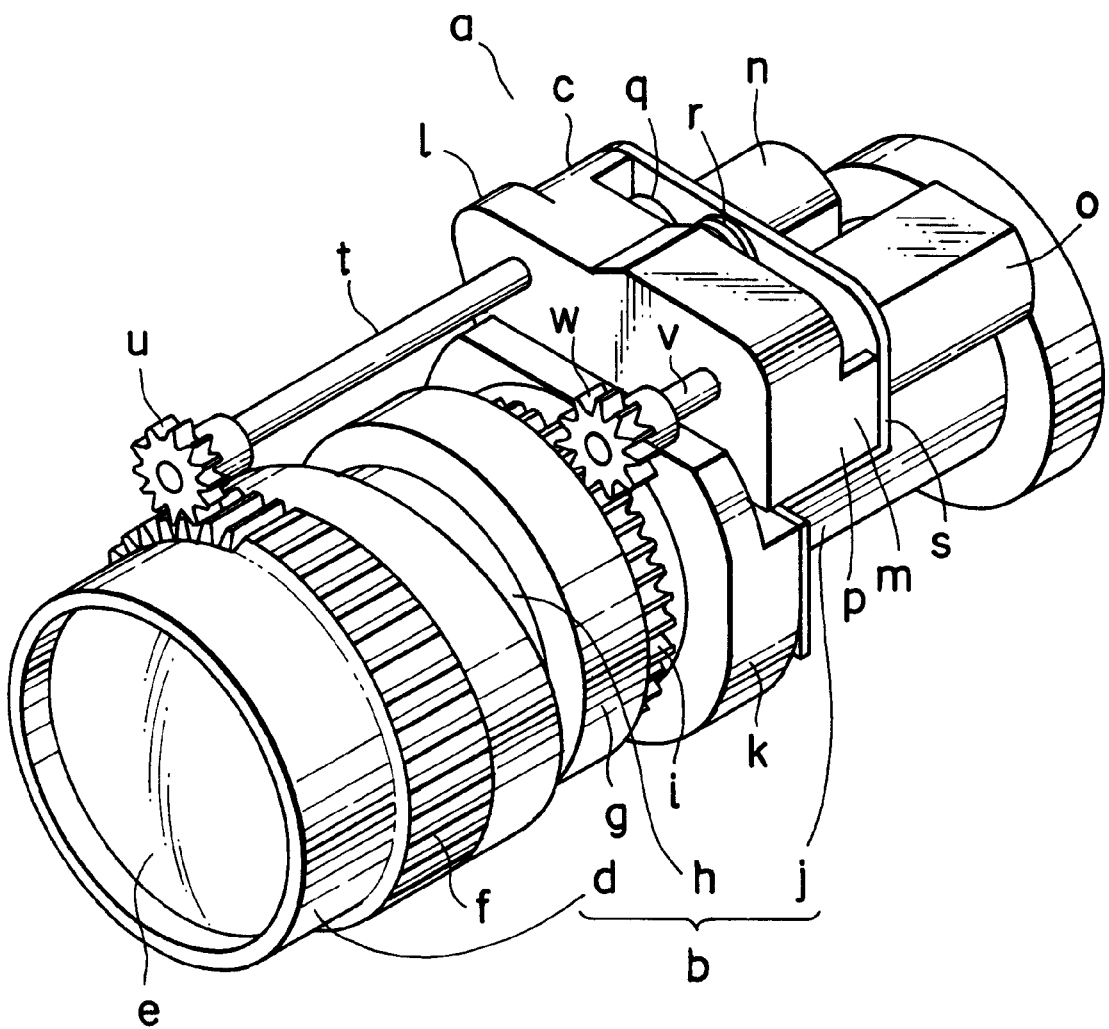
FIG. 19 is a perspective view showing an exemplary one of conventional zoom lens apparatus.

Referring now to FIGS. 16 to 18, there is shown a zoom lens apparatus according to a second preferred embodiment of the present invention. The zoom lens apparatus generally denoted at 1A is a modification to the zoom lens apparatus 1 described above and is different only in construction of the focusing lens driving section. Accordingly, detailed description is given only of the focusing lens driving section.

The rear half denoted at 4A of the modified zoom lens apparatus 1A is opened at a rear face thereof, and the rear face opening is closed by a rear face plate 62. A rectangular window 63 is formed in the rear face plate 62, and the light receiving face 19a of the imaging element 19 supported on the imaging element holder 18 mounted on the rear face of the rear face plate 62 faces to the front through the window 63.

A stator block 64 is formed from a material having a suitable permeability and has a base plate portion 65 and an inner side yoke portion 66 in the form of an angular tube extending forwardly from an opening edge portion of the base plate portion 65 around a large rectangular opening 65a which is formed at a portion a little downwardly from the center of the base plate portion 65. The stator block 64 further has four outer yoke portions 67 extending forwardly from four side edges of the base plate portion 65 and opposed in parallel to four outer side faces of the inner side yoke portion 66. The inner yoke portion 65 and the outer yoke portions 67 are formed integrally on the base plate portion 65. Four magnets 68 each in the form of a flat plate are secured by adhesion or like means to inner faces of the outer yoke portions 67 opposing to the inner side yoke portion 66. Thus, a closed magnetic path is formed from the base plate portion 65, the inner side yoke portion 66, the outer yoke pieces 67 and the magnets 68 of the stator block 64.

A lens holding member 69 supports the focusing lens set 17 thereon and has a support tube 70 thereon, and the recess 47 is formed in the lens holding member 69. A lens holding frame 71 is formed at a portion displaced a little downwardly from the center of the lens holding member 69.

The support tube 70 of the lens holding member 69 is outwardly fitted for sliding movement on a guide rod 72 provided on and extending from the support wall 10 of the housing 2, and the recess 47 of the lens holding member 69 is held in engagement for sliding movement with the auxiliary guide rod 39. Consequently, the lens holding member 69 is disposed for movement in the direction of the optic axis in the spacing 9b of the housing 2.

A coil bobbin 73 in the form of an angular tube is mounted on and extends rearwardly from a rear face of the lens holding member 69, and a movable coil 74 is wound on an outer peripheral face of the coil bobbin 73.

The movable coil 74 is positioned between the inner side yoke portion 66 and the outer yoke pieces 67 of the stator block 64.

Accordingly, when the movable coil 74 is energized the movable coil 74 is acted upon by a moving force in the forward or rearward direction so that the lens holding member 69 is moved in the forward or rearward direction under the guidance of the guide rod 72 and the auxiliary guide rod 39. Consequently, the focusing lens set 17 is moved in the forward or rearward direction, that is, in the direction of the optic axis of the lens system, thereby performing focusing.

It is to be noted that the concrete shapes and construction described hereinabove in connection with the embodiments are illustration only of a mere example in putting the present invention into practice, and the technical scope of the present invention shall not be construed restrictively by them.

What is claimed is:

1. A zoom lens apparatus, comprising:

a lens system including a zoom lens set, a focusing lens set and an iris disposed on a single optic axis;

a zoom lens driving section for driving said zoom lens set;

a focusing lens driving section for driving said focusing lens set;

an iris driving section for driving said iris to open or close; and a housing having a substantially rectangular outer profile and accommodating said lens system, zoom lens driving section, focusing lens driving section and iris driving section therein.

2. A zoom lens comprising:

a housing having a substantially rectangular outer profile and having a longitudinal axis;

a lens system located within said longitudinal axis along an optical axis which is substantially parallel to said longitudinal axis, said lens system including a zoom lens group, a focusing lens group and an adjustable iris;

means provided in said housing for adjusting the position of said zoom lens group along said optical axis;

means provided in said housing for adjusting the position of said focusing lens along said optical axis; and means provided in said housing for adjusting said iris.

* * * * *